United States Patent
Heitlinger et al.

(10) Patent No.: US 12,262,654 B2
(45) Date of Patent: Apr. 1, 2025

(54) UPPER LINK FOR A THREE-POINT POWER LIFT OF AN AGRICULTURAL TRACTOR

(71) Applicant: DEERE & COMPANY, Moline, IL (US)

(72) Inventors: Martin Heitlinger, Oestringen (DE); Achim Schibel, Heidelberg (DE)

(73) Assignee: DEERE & COMPANY, Moline, IL (US)

( * ) Notice: Subject to any disclaimer, the term of this patent is extended or adjusted under 35 U.S.C. 154(b) by 376 days.

(21) Appl. No.: 17/655,626

(22) Filed: Mar. 21, 2022

(65) Prior Publication Data
US 2022/0330467 A1    Oct. 20, 2022

(30) Foreign Application Priority Data

Apr. 14, 2021 (DE) .......................... 102021109328.7

(51) Int. Cl.
*A01B 59/00* (2006.01)
*A01B 59/043* (2006.01)
*A01B 59/06* (2006.01)

(52) U.S. Cl.
CPC .......... *A01B 59/004* (2013.01); *A01B 59/043* (2013.01); *A01B 59/066* (2013.01)

(58) Field of Classification Search
CPC ... A01B 59/004; A01B 59/043; A01B 59/066; A01B 59/002; A01B 59/006; E02F 3/7622
See application file for complete search history.

(56) References Cited

U.S. PATENT DOCUMENTS 2,920,912 A * 1/1960 Hess .................... A01B 59/004
403/46
3,404,901 A * 10/1968 Rau ...................... A01B 59/067
280/504

(Continued)

FOREIGN PATENT DOCUMENTS

CA            640206 A     4/1962
DE           1287348 B     1/1969
(Continued)

OTHER PUBLICATIONS

WD-40 Specialist, "How to Properly Lubricate Metal on Metal", Sep. 28, 2016 (Year: 2016).*

(Continued)

*Primary Examiner* — Adam J Behrens
*Assistant Examiner* — Blake E Scoville

(57) ABSTRACT

An upper link for a three-point power lift of an agricultural tractor including a cylindrical connecting sleeve, a first fastening element rotated into a first open end of the cylindrical connecting sleeve and configured to be attached to the agricultural tractor, a second fastening element rotated into a second open end of the cylindrical connecting sleeve and configured to produce a releasable connection to an attachment, and a retaining bar attached to the first fastening element. The retaining bar includes a bar portion having a locking region for receiving a retaining catch and runs spaced apart along the cylindrical connecting sleeve. The retaining bar includes a support element encompassing the cylindrical connecting sleeve such that the connecting sleeve is rotationally displaceable, and the length of the upper link is varied by rotating the cylindrical connecting sleeve.

18 Claims, 2 Drawing Sheets

(56) References Cited

U.S. PATENT DOCUMENTS

| | | | |
|---|---|---|---|
| 4,222,583 A | | 9/1980 | Schillings |
| 4,778,194 A | | 10/1988 | Koch et al. |
| 5,076,369 A | * | 12/1991 | Herchenbach ......... B60D 1/249 |
| | | | 172/679 |
| 6,609,575 B1 | * | 8/2003 | Crabb .................... B60D 1/141 |
| | | | 280/491.2 |
| 6,655,468 B2 | * | 12/2003 | Casali .................. A01B 59/004 |
| | | | 403/44 |
| 7,048,071 B1 | * | 5/2006 | Huenink ............. A01B 59/004 |
| | | | 403/46 |
| 9,179,590 B2 | * | 11/2015 | Heitlinger ............ A01B 59/041 |
| 9,221,313 B2 | * | 12/2015 | Heitlinger ............ A01B 59/041 |
| 9,480,197 B2 | * | 11/2016 | Heitlinger ............ A01B 59/041 |
| 10,595,453 B2 | * | 3/2020 | Woelfle .................. B60D 1/141 |
| 10,897,842 B2 | | 1/2021 | Bhosale et al. |
| 2019/0327877 A1 | | 10/2019 | Schibel et al. |
| 2021/0127542 A1 | | 5/2021 | Hingne et al. |

FOREIGN PATENT DOCUMENTS

| | | | | |
|---|---|---|---|---|
| DE | 3938419 C | | 3/1991 | |
| DE | 102007019128 A1 | * | 10/2008 | ........... A01B 59/043 |
| DE | 102007009137 A1 | | 11/2008 | |

OTHER PUBLICATIONS

European Search Report in application No. 22163137.7, dated Sep. 26, 2022, 6 pages.

* cited by examiner

UPPER LINK FOR A THREE-POINT POWER LIFT OF AN AGRICULTURAL TRACTOR

CROSS-REFERENCE TO RELATED APPLICATIONS

This application claims priority to German Patent Application No. 102021109328.7, filed Apr. 14, 2021, the disclosure of which is hereby incorporated by reference.

FIELD OF THE DISCLOSURE

The present disclosure relates to an upper link for a three-point power lift of an agricultural tractor.

BACKGROUND

Agricultural vehicles can include three-point hitches for attaching implements. Agricultural vehicles can have front or rear three-point hitches. Three-point hitches have an upper link arm and lower link arms.

SUMMARY

A longitudinally variable upper link for a three-point power lift is disclosed, for example, in DE 39 38 419 C. Since in this case the longitudinal adjustment has to be carried out by hand, the design thereof (to be distinguished from the also commonly used hydraulic upper links) is also denoted as "mechanical." The upper link is a component of a conventional three-point power lift which is attached on the rear side to an agricultural tractor and which, in addition to the upper link, also has first and second lower links which may be lowered or lifted by means of a hydraulic lifting gear. Respective coupling apparatuses are located both at the ends of the lower links and the upper link, wherein these coupling apparatuses are generally designed as coupling hooks, mating pieces in the form of coupling balls or coupling pins which are assigned to the coupling points on the attachment side being able to be releasably latched therein.

If no attachment is attached to the three-point power lift or only the lower links are used for the operation thereof, which is relevant, for example, in the case of abnormally wide and correspondingly heavy seed drills, the upper link which is attached to the agricultural tractor has to be stowed in the meantime in a predetermined transport position. A common measure provides that the upper link is pivoted upwardly and blocked in this position by means of a securing pin inside a U-shaped receiving plate. It is a drawback here that the upper link has to be simultaneously held with the free hand when repositioning the securing pin.

A developed arrangement from a handling perspective, for use with a hydraulic upper link, is proposed in this regard in DE 10 2007 009 137 A1. This arrangement includes a self-locking snap closure which is latched into a retaining clip provided on an upper face of the hydraulic upper link and which thus retains this retaining clip in a pivoted-up position provided for transport.

According to an aspect of the present disclosure, an upper link for a three-point power lift of an agricultural tractor includes a cylindrical connecting sleeve, opposing internal threads being configured in the open ends thereof, wherein a fastening element with an external thread corresponding to the internal thread is screwed into each of the two open ends, such that the length of the upper link may be varied by rotating the cylindrical connecting sleeve, wherein a first of the two fastening elements may be attached on the tractor side and a second of the two fastening elements has a coupling apparatus for producing a releasable connection to a coupling point on the attachment side.

In view of the above, it is the object of the present disclosure to specify an upper link of mechanical design which permits a use of a self-locking snap closure or a comparable mechanism for blocking the upper link in a predetermined transport position. This object is achieved by an upper link having one or more of the following features.

The upper link for a three-point power lift of an agricultural tractor includes a cylindrical connecting sleeve, opposing internal threads being configured in the open ends thereof, wherein a fastening element with an external thread corresponding to the internal thread is screwed into each of the two open ends, such that the length of the upper link may be varied by rotating the cylindrical connecting sleeve, wherein a first of the two fastening elements may be attached on the tractor side and a second of the two fastening elements has a coupling apparatus for producing a releasable connection to a coupling point on the attachment side. A retaining bar is also attached to the first fastening element, a bar portion with a locking region for receiving a retaining catch and running spaced apart along the cylindrical connecting sleeve being configured thereon, wherein a support element is attached to an open portion end, said support element encompassing the cylindrical connecting sleeve such that said connecting sleeve is borne so as to be rotationally displaceable therein.

In such a case the retaining catch may be a component of a snap closure which is simple to operate, as is disclosed in DE 10 2007 009 137 A1. However, any other mechanism which is able to engage the locking region securely on the retaining bar in order to block the upper link in its predetermined transport position on the agricultural tractor is also conceivable. The support element takes account of the bending forces occurring in such a case on the retaining bar due to the weight, by the open portion end thereof being able to be supported on the cylindrical connecting sleeve without hindering the rotatability of the cylindrical connecting sleeve which is required for the longitudinal adjustment.

Other advantageous embodiments of the upper link according to the disclosure are disclosed herein.

In order to provide a defined bearing region for the retaining catch, the bar portion runs in a linear manner at least in the locking region, for example, substantially parallel to the cylindrical connecting sleeve. For the purpose of uncomplicated production, the linear bar portion may also extend continuously from a curved transition piece, which is attached to the first fastening element, to the open portion end thereof. The retaining bar may be welded by means of the curved transition piece to the first fastening element, for which purpose both parts includes steel. More specifically, the retaining bar may be fastened to a mounting flange configured on the first fastening element, wherein the mounting flange includes a fastening eye for receiving a ball joint which may be attached to the agricultural tractor and which permits a pivoting of the upper link in the vertical and/or horizontal direction.

There is also the possibility that the support element encompasses the cylindrical connecting sleeve all around. Apart from a certain bearing play which is required for ensuring the free rotatability of the cylindrical connecting sleeve, the deflection of bending loads acting on the retaining bar is carried out uniformly in such a case.

Additionally, a sliding element may be located between the cylindrical connecting sleeve and the support element, wherein the sliding element is attached, for example, to the support element. In some embodiments, the sliding element entirely surrounds the outer contour of the cylindrical connecting sleeve, wherein for example said sliding element is a lip which includes plastics and which is fitted onto the support element. In this case a use of polyamide, PTFE or the like is relevant as the plastics material. On the other hand, it is also conceivable to configure the sliding element on the cylindrical connecting sleeve, for example as spacer ribs which run longitudinally along the outer contour and which are an integral component of the cylindrical sleeve body. In such a case said sleeve body may be produced as a cast part including steel.

In order to prevent an inadvertent adjustment of the upper link length, a securing clip may be attached to the cylindrical connecting sleeve, said securing clip being able to be pivoted by hand from a blocking position which may be latched to the support element into an actuating position releasing the rotation of the cylindrical connecting sleeve. In its pivoted-out actuating position, the securing clip forms at the same time a lever which facilitates a rotation of the cylindrical connecting sleeve by hand.

An automatic release of the securing lever may be additionally prevented by the securing clip being pretensioned in the direction of the blocking position. To this end, the securing clip may include a wire clip which is bent in a U-shaped manner, the ends thereof being received eccentrically offset in associated bearing bores of a projection which is provided on the cylindrical connecting sleeve such that, when pivoted out of the blocking position, a restoring spring tensioning is created inside the wire clip.

In some embodiments, for bearing the cylindrical connecting sleeve the support element includes a retaining plate with a circular receiving opening through which the cylindrical connecting sleeve is guided. The retaining plate can include a steel plate and may be riveted or welded to the open portion end of the retaining bar. In order to use the available constructional space in the best possible manner, the retaining plate can have an outer contour which tapers in the direction of the retaining bar and which is adapted to the cross section of the portion end to be attached thereto.

For latching the securing clip in the blocking position, opposing latching lugs may be formed along the outer contour of the retaining plate. These latching lugs encompass the U-shaped wire clip from the outside or inside, such that they push together or push apart the two wire limbs in a spring-elastic manner when the securing clip is released. At the same time, the counterforce to be overcome leads to a reliable fixing of the securing clip in the blocking position.

It is also conceivable that an edge protector is attached along the circular receiving opening, said edge protector preventing possible damage to the (painted) surface of the cylindrical connecting sleeve guided therein, if this connecting sleeve is rotated by hand for the purpose of the longitudinal adjustment of the upper link. The edge protector may at the same time undertake the function of the above-described sliding element and accordingly may be formed by a peripheral plastics lip fitted onto the edge of the receiving opening.

A weight relieving means, which may be fastened to a mounting point on the tractor side, may be additionally provided on the first fastening element. The weight relieving means, for example, is a tension spring which is articulated with a first end on a fastening tab attached to the first fastening element and which is articulated with a second end on the mounting point provided in the rear region of the agricultural tractor. The handling may be significantly improved, even of relatively heavy upper links, by the corresponding dimensioning of the spring constants of the tension spring. The principal construction of such a weight relieving means is shown, for example, in detail in DE 10 2007 019 128 A1.

The upper link according to the disclosure for a three-point power lift of an agricultural tractor is described in more detail hereinafter with reference to the accompanying drawings. In this case, identical reference numerals refer to components which coincide, or which are comparable relative to their function.

The above and other features will become apparent from the following detailed description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

The embodiments or implementations disclosed in the above drawings and the following detailed description are not intended to be exhaustive or to limit the present disclosure to these embodiments or implementations.

Figure 1:
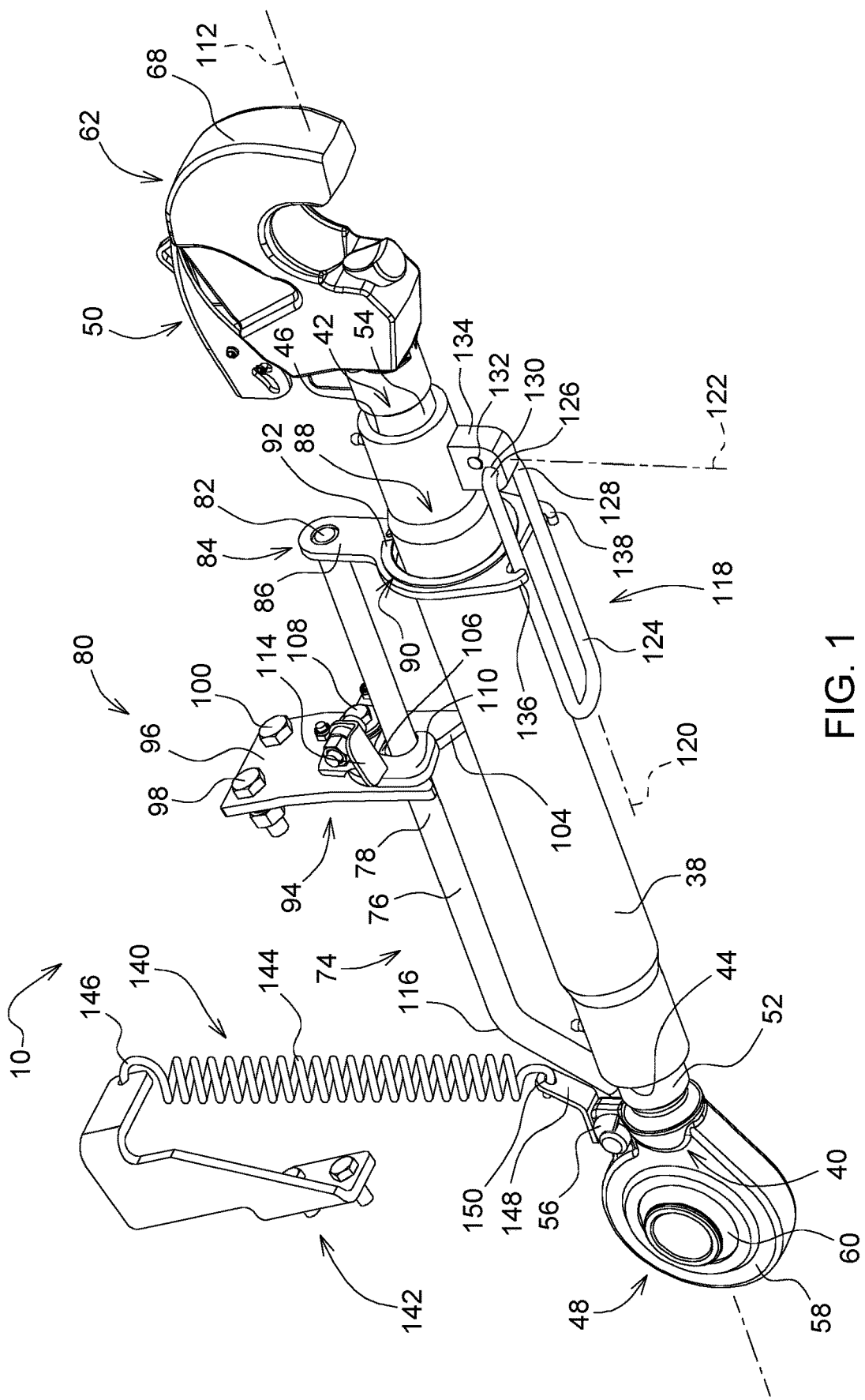
FIG. 1 shows an upper link, according to an embodiment.
Figure 2:
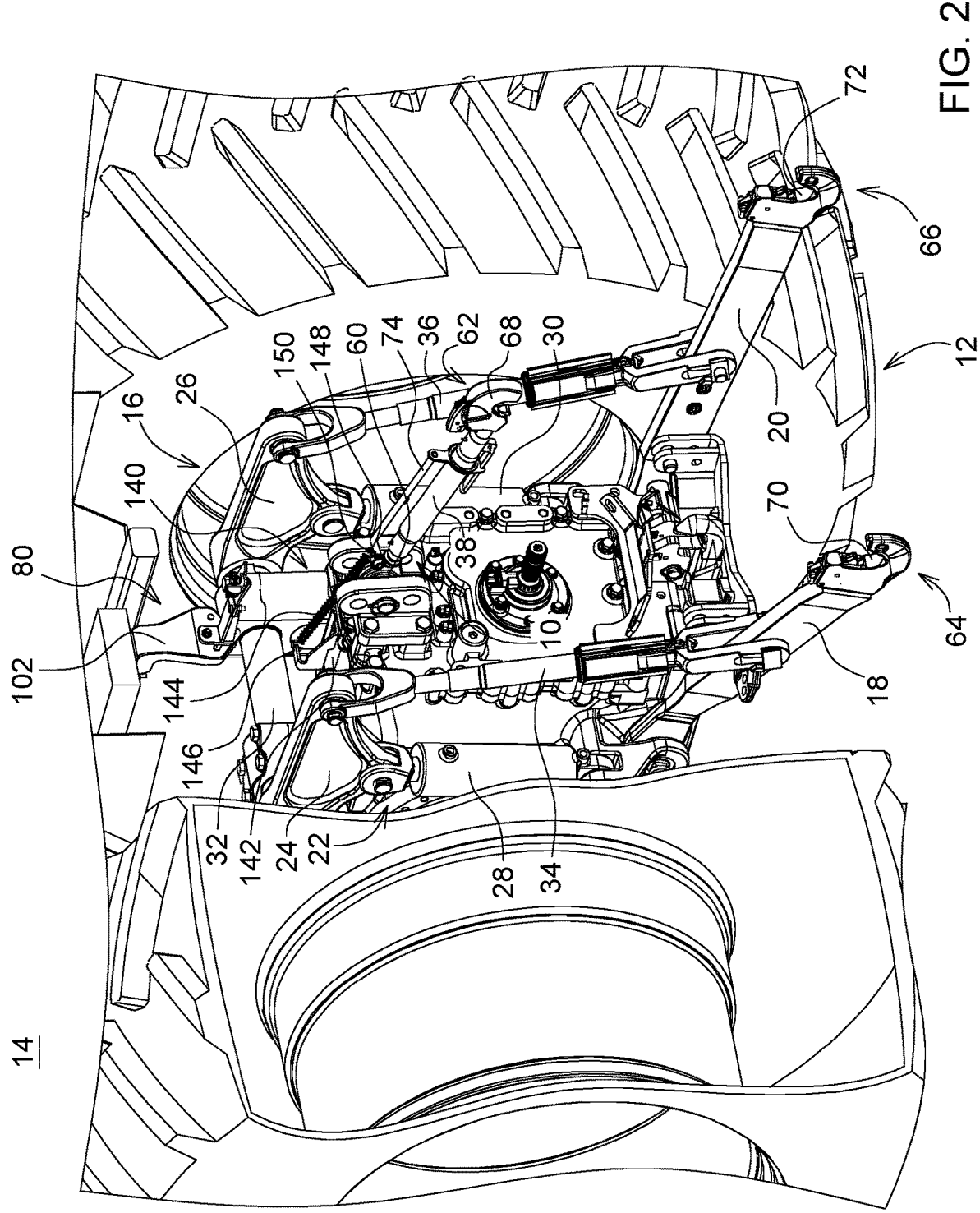
FIG. 2 shows a three-point power lift provided with an upper link on an agricultural tractor, according to an embodiment.

FIG. 1 shows an embodiment of the upper link 10. The upper link 10 according to FIG. 2 is a component of a three-point power lift 12 on an agricultural tractor 14.

The three-point power lift 12 which is located in the rear region 16 of the agricultural tractor 14 also includes first and second lower links 18, 20 in addition to the centrally attached upper link 10. These lower links may be lowered or lifted by means of a hydraulic lifting gear 22, amongst other things at the instigation of an operator. To this end, the hydraulic lifting gear 22 has first and second lifting arms 24, 26 which are pivotable about a common axis 32 by means of associated hydraulic cylinders 28, 30, wherein the pivoting movement is able to be transmitted synchronously to the lower links 18, 20 by means of longitudinally adjustable lifting struts 34, 36.

As may be identified in FIG. 1, the upper link 10 includes a cylindrical connecting sleeve 38, opposing internal threads 44, 46 being configured in the open ends 40, 42 thereof. A first or second fastening element 48, 50 with an external thread 52, 54 corresponding to the internal thread 44, 46 is screwed into each of the two open ends 40, 42 such that the length of the upper link 10 may be varied by rotating the cylindrical connecting sleeve 38. The first fastening element 48 is attached on the tractor side. A mounting flange 56 is configured on the first fastening element 48, said mounting flange including a fastening eye 58 for receiving a ball joint 60 which may be attached to the agricultural tractor 14 and which permits a pivoting of the upper link 10 in the vertical and/or horizontal direction. The second fastening element 50 has a coupling apparatus 62 for producing a releasable connection with a coupling point on the attachment side.

Further coupling apparatuses 64, 66 are located at the ends of the lower links 18, 20. In the present case both the coupling apparatus 62 of the upper link 10 and the two coupling apparatuses 64, 66 of the lower links 18, 20 are designed as coupling hooks 68, 70, 72, mating pieces in the form of coupling balls or coupling pins which are assigned to the coupling points on the attachment side being able to be releasably latched therein. The dimensioning and position of the coupling balls or coupling pins differ according to the type of three-point power lift 12.

Since the longitudinal adjustment has to be carried out by hand in the case of the upper link 10, the design thereof (to be distinguished from the also commonly used hydraulic upper links) is also denoted as "mechanical."

A retaining bar 74 is attached to the first fastening element 48, a bar portion 76 with a locking region 78 for receiving a retaining catch 80 and running spaced apart along the cylindrical connecting sleeve 38 being configured thereon. In this case a support element 84 is attached to an open portion end 82, said support element encompassing the cylindrical connecting sleeve 38 such that said connecting sleeve is borne so as to be rotationally displaceable therein.

By way of example, for bearing the cylindrical connecting sleeve 38 the support element 84 includes a retaining plate 86 with a circular receiving opening 88 through which the cylindrical connecting sleeve 38 is guided. The retaining plate 86 can include a steel plate and is riveted or welded to the open portion end 82 of the retaining bar 74. In order to use the available constructional space in the best possible manner, the retaining plate 86 has an outer contour which tapers in the direction of the retaining bar 74 and which is adapted to the cross section of the portion end 82 attached thereto.

A sliding element 90 is located between the cylindrical connecting sleeve 38 and the support element 84, wherein the sliding element 90 according to FIG. 1 is attached to the support element 84. The sliding element 90 forms at the same time an edge protector which prevents possible damage to the (painted) surface of the cylindrical connecting sleeve 38 guided therein, if this connecting sleeve is rotated by hand for the purpose of the longitudinal adjustment of the upper link 10. The sliding element 90 entirely surrounds the outer contour of the cylindrical connecting sleeve 38, wherein said sliding element is a lip 92 which includes plastics material and which is fitted onto the support element 84. A use of polyamide, PTFE or the like is relevant as the plastics material.

The internal diameter of the receiving opening 88 configured in the retaining plate 86, including the sliding element 90, is dimensioned to be slightly larger than the external diameter of the cylindrical sleeve body, resulting in a certain bearing play which is required for ensuring the free rotatability of the cylindrical connecting sleeve 38.

As may be identified in FIG. 2, the retaining catch 80 is located in a region above the upper link 10. By way of example, the retaining catch 80 is a component of a snap closure 94 as is described in detail in DE 10 2007 009 137 A1. The snap closure 94 includes a base plate 96 which is screwed horizontally by means of first and second bolts 98, 100 to a bracket 102 provided in the region 16 of the agricultural tractor 14. A V-shaped guide region 104 which is configured thereon opens into a receiving slot 106 which has an inner contour corresponding to the cross section of the locking region 78 of the retaining bar 74. A rotary lock 110, which is pivotably attached to the base plate 96 by means of a bolt 108, is forced into a position opening up the receiving slot 106 when the upper link 10 is pivoted up in the direction of a predetermined transport position 112 by the retaining bar 74, wherein the rotary lock 110 snaps back into its resting position by the action of a restoring spring force as soon as the retaining bar 74 bears fully in the receiving slot 106. On the other hand, for releasing the blocking, the rotary lock 110 is rotated by hand out of its resting position by means of an actuator 114 attached thereto, releasing the retaining bar 74 and thus the upper link 10.

In this manner the upper link 10 may be stowed away in the predetermined transport position 112 if it is not immediately required. This is the case, for example, if no attachment is attached to the three-point power lift 12 or only the lower links 18, 20 are used for the operation thereof, which is relevant, for example, in the case of abnormally wide and correspondingly heavy seed drills.

In order to provide a defined bearing region for the retaining catch 80, the bar portion 76 runs in a linear manner at least in the locking region 78, substantially parallel to the cylindrical connecting sleeve 38 or the cylindrical sleeve body encompassed thereby. In the present case, the linear bar portion 76 extends continuously from a curved transition piece 116, which is attached to the first fastening element 48, to the open portion end 82 thereof. The retaining bar 74 is welded by means of the curved transition piece 116 to the first fastening element 48 or the mounting flange 56 configured thereon, for which purpose both parts include steel.

The support element 84 takes account of the bending forces occurring in such a case on the retaining bar 74 due to the weight, by the open portion end 82 thereof being able to be supported on the cylindrical connecting sleeve 38 without hindering the rotatability of the cylindrical connecting sleeve 38 which is required for the longitudinal adjustment.

In order to prevent an undesired adjustment of the upper link length, a securing clip 118 is attached to the cylindrical connecting sleeve 38, said securing clip being able to be pivoted by hand from a blocking position 120 which may be latched to the support element 84 into an actuating position 122 releasing the rotation of the cylindrical connecting sleeve 38. In its pivoted-out actuating position 122, the securing clip 118 forms at the same time a lever which facilitates a rotation of the cylindrical connecting sleeve 38 by hand.

To this end, the securing clip 118 includes a wire clip 124 which is bent in a U-shaped manner, the ends 126, 128 thereof being received eccentrically offset in associated bearing bores 130, 132 of a projection 134 which is provided on the cylindrical connecting sleeve 38 such that, when pivoted out from the blocking position 120, a restoring spring tensioning is created inside the wire clip 124. In this manner, the securing clip 118 is pretensioned in the direction of the blocking position 120.

For latching the securing clip 118 in the blocking position 120, opposing latching lugs 136, 138 are formed along the outer contour of the retaining plate 86, said latching lugs encompassing the U-shaped wire clip 124 from the outside such that they push together the two wire limbs in a spring-elastic manner when the securing clip 118 is released. The counterforce to be overcome in this case leads to a reliable fixing of the securing clip 118 in the blocking position 120.

Additionally, a weight relieving means 140, which is fastened to a mounting point 142 on the tractor side, is provided on the first fastening element 48. The weight relieving means 140 is a tension spring 144 which is articulated with a first end 146 on a fastening tab 148 attached to the first fastening element 48 and which is articulated with a second end 150 on the mounting point 142 provided in the rear region 16 of the agricultural tractor 14. The handling may be significantly improved, even of relatively heavy upper links, by the corresponding dimensioning of the spring constants of the tension spring 144. The principal construction of such a weight relieving means 140 is shown in detail in DE 10 2007 019 128 A1.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may be comprised of any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. An upper link for a three-point power lift of an agricultural tractor, comprising:
   a cylindrical connecting sleeve including a first internal thread in a first open end and a second internal thread in a second open end, a length of the upper link is varied by rotating the cylindrical connecting sleeve;
   a first fastening element having a first external thread corresponding to the first internal thread, the first fastening element rotated into the first open end, the first fastening element configured to be attached to the agricultural tractor;
   a second fastening element having a second external thread corresponding to the second internal thread, the second fastening element rotated into the second open end, the second fastening element including a coupling apparatus configured to produce a releasable connection to a coupling point on an attachment; and
   a retaining bar fixedly attached to the first fastening element for movement as a unit therewith, the retaining bar including a bar portion having a locking region for receiving a retaining catch, the bar portion running spaced apart along the cylindrical connecting sleeve, the retaining bar including a support element encompassing the cylindrical connecting sleeve such that the cylindrical connecting sleeve is rotationally displaceable relative to the retaining bar; and,
   a securing clip pivotally attached to the cylindrical connecting sleeve, the securing clip pivoting between a blocking position latched to the support element and an actuating position releasing the rotation of the cylindrical connecting sleeve.

2. The upper link of claim 1, wherein the bar portion runs in a linear manner at least in the locking region.

3. The upper link of claim 1, wherein the support element encompasses the cylindrical connecting sleeve all around.

4. The upper link of claim 1, wherein a sliding element is attached to the support element, the sliding element is located between the cylindrical connecting sleeve and the support element.

5. The upper link of claim 1, wherein the securing clip is pretensioned in the direction of the blocking position.

6. The upper link of claim 1, wherein the support element includes a retaining plate with a circular receiving opening through which the cylindrical connecting sleeve is guided for bearing the cylindrical connecting sleeve.

7. The upper link of claim 6, wherein the retaining plate includes opposing latching lugs along the outer contour for latching the securing clip in the blocking position.

8. The upper link of claim 6, wherein an edge protector is attached along the circular receiving opening.

9. The upper link of claim 1, further comprising:
   a tension spring attached to the first fastening element and configured to be fastened to a mounting point on the agricultural tractor.

10. The upper link of claim 1, wherein the cylindrical connecting sleeve is rotatable relative to the support element.

11. The upper link of claim 1, wherein the securing clip forms a lever which facilitates rotation of the cylindrical connecting sleeve in the actuating position.

12. An agricultural tractor, comprising:
    an upper link for a three-point power lift, the upper link including:
    a cylindrical connecting sleeve including a first internal thread in a first open end and a second internal thread in a second open end, a length of the upper link is varied by rotating the cylindrical connecting sleeve;
    a first fastening element having a first external thread corresponding to the first internal thread, the first fastening element rotated into the first open end, the first fastening element configured to be attached to the agricultural tractor;
    a second fastening element having a second external thread corresponding to the second internal thread, the second fastening element rotated into the second open end, the second fastening element including a coupling apparatus configured to produce a releasable connection to a coupling point on an attachment; and
    a retaining bar fixedly attached to the first fastening element for movement as a unit therewith, the retaining bar including a bar portion having a locking region for receiving a retaining catch, the bar portion running spaced apart along the cylindrical connecting sleeve, the retaining bar including a support element encompassing the cylindrical connecting sleeve such that the cylindrical connecting sleeve is rotationally displaceable relative to the retaining bar; and, a securing clip pivotally attached to the cylindrical connecting sleeve, the securing clip pivoting between a blocking position latched to the support element and an actuating position releasing the rotation of the cylindrical connecting sleeve.

13. The agricultural tractor of claim 12, wherein the securing clip forms a lever which facilitates rotation of the cylindrical connecting sleeve in the actuating position.

14. The agricultural tractor of claim 12, wherein the support element includes a retaining plate with a receiving opening through which the cylindrical connecting sleeve is guided for bearing the cylindrical connecting sleeve, wherein the retaining plate includes opposing latching lugs along the outer contour for latching the securing clip in the blocking position.

15. An upper link for a three-point power lift of an agricultural tractor, comprising:

a cylindrical connecting sleeve including a first internal thread in a first open end and a second internal thread in a second open end;

a first fastening element having a first external thread corresponding to the first internal thread, the first fastening element rotated into the first open end, the first fastening element configured to be attached to the agricultural tractor;

a second fastening element having a second external thread corresponding to the second internal thread, the second fastening element rotated into the second open end, the second fastening element including a coupling apparatus configured to produce a releasable connection to a coupling point on an attachment;

a retaining bar attached to the first fastening element, the retaining bar including a bar portion having a locking region for receiving a retaining catch, the bar portion running spaced apart along the cylindrical connecting sleeve, the retaining bar including a support element encompassing the cylindrical connecting sleeve such that the cylindrical connecting sleeve is rotationally displaceable, and a length of the upper link is varied by rotating the cylindrical connecting sleeve; and a securing clip attached to the cylindrical connecting sleeve, the securing clip pivotal from a blocking position latched to the support element into an actuating position releasing the rotation of the cylindrical connecting sleeve.

16. The upper link of claim 15, wherein the securing clip is pretensioned in the direction of the blocking position.

17. The upper link of claim 15, further comprising a retaining plate including opposing latching lugs for latching the securing clip in the blocking position.

18. The upper link of claim 15, wherein the retaining bar is fixedly attached to the first fastening element for movement as a unit therewith.

* * * * *